United States Patent
Rudolph et al.

(10) Patent No.: US 7,248,639 B2
(45) Date of Patent: Jul. 24, 2007

(54) METHOD FOR REDUCING THE OUT-OF-BAND EMISSION IN AM TRANSMITTERS FOR DIGITAL TRANSMISSION

(75) Inventors: Dietmar Rudolph, Berlin (DE); Andreas Schaefer, Freiwalde (DE)

(73) Assignee: Deutsche Telekom AG, Bonn (DE)

( * ) Notice: Subject to any disclaimer, the term of this patent is extended or adjusted under 35 U.S.C. 154(b) by 692 days.

(21) Appl. No.: 10/275,424

(22) PCT Filed: Jan. 17, 2002

(86) PCT No.: PCT/EP02/00431

§ 371 (c)(1),
(2), (4) Date: Nov. 5, 2002

(87) PCT Pub. No.: WO02/071663

PCT Pub. Date: Sep. 12, 2002

(65) Prior Publication Data

US 2003/0108112 A1    Jun. 12, 2003

(30) Foreign Application Priority Data

Mar. 6, 2001    (DE) ................................ 101 12 025

(51) Int. Cl.
*H03C 3/00* (2006.01)
*H03C 1/00* (2006.01)
*H04L 27/12* (2006.01)
*H04B 15/00* (2006.01)

(52) U.S. Cl. ...................... 375/268; 375/278; 375/285; 375/300; 332/103; 332/144; 332/145; 332/149

(58) Field of Classification Search ................ 375/261, 375/268–273, 278–279, 285, 295, 298, 308, 375/300–303; 332/103, 144, 145, 149, 150, 332/159, 160, 155
See application file for complete search history.

(56) References Cited

U.S. PATENT DOCUMENTS

| | | | |
|---|---|---|---|
| 4,403,255 A | 9/1983 | Schiff | 358/186 |
| 4,955,072 A * | 9/1990 | Tomljenovic | 455/108 |
| 5,646,962 A | 7/1997 | Harrison | 375/308 |
| 6,125,103 A | 9/2000 | Bäuml et al. | 370/203 |
| 6,751,267 B1 | 6/2004 | Schill et al. | 375/296 |

FOREIGN PATENT DOCUMENTS

| | | |
|---|---|---|
| DE | 32 43 489 C2 | 6/1983 |
| DE | 195 35 030 A | 4/1996 |
| DE | 44 41 323 A1 | 5/1996 |
| DE | 195 41 441 A1 | 6/1996 |
| DE | 196 35 813 A1 | 3/1998 |
| DE | 19717169 | 10/1998 |
| DE | 198 08 993 A1 | 9/1999 |
| EP | 0 708 546 A | 4/1996 |
| EP | 0708545 | 4/1996 |
| EP | 0 874 483 A | 10/1998 |

OTHER PUBLICATIONS

Jochen H. Schiller, Mobile Communications, 2003, Addison-Wesley, Second Edition, pp. 46-54.*

(Continued)

*Primary Examiner*—Kevin Kim
*Assistant Examiner*—Linda Wong
(74) *Attorney, Agent, or Firm*—Darby & Darby

(57) ABSTRACT

A method for reducing out-of-band emission in an AM transmitter for digital transmission includes generating, from a digital modulation signal, an amplitude signal and a phase-modulated radio frequency signal configured to control the AM transmitter. A digital modulation process is used in which a hole is formed around a 0/0 point so that a zero crossing is avoided by a substantial margin in a vector diagram representation. Thereby a respective bandwidth of the amplitude signal and the phase-modulated radio frequency signal is limited so that the out-of-band emission decreases as a function of a shoulder distance achievable by the AM transmitter at a rate where a spectrum mask is not exceeded.

10 Claims, 4 Drawing Sheets

OTHER PUBLICATIONS

Raab et al., "L-Band Transmitter Using Kahn EER Technique", IEEE Transactions on Microwave Theory and Techniques, vol. 46, No. 12, Dec. 1998□□.*

Namiki, Junji, "An automatically Controlled Predistorter for Multilevel Quadrature Amplitude Modulation", IEEE Transactions on Communications, vol. COM-31 No. 5 May 1983.*

Yamazato et al, "Performance evaluation of modified HPSK for Wideband CDMA", IEEE 6th Int. Symp. On Spread-Spectrum Tech. And Appli. NJIT, New Jersey, Sep. 6-8, 200.*

Recommendation ITU-R SM.328-9: "Spectra and Bandwidth of Emissions", pp. 1-38, 1948.

International Search Report for International Application No. PCT/EP02/00431 (2 pages), Mar. 3, 2003.

* cited by examiner

METHOD FOR REDUCING THE OUT-OF-BAND EMISSION IN AM TRANSMITTERS FOR DIGITAL TRANSMISSION

CROSS REFERENCE TO RELATED APPLICATIONS

This application claims the benefit of International Patent Application No. PCT/EP02/0043 1, filed on Jan. 17, 2002, which claims priority to German Patent Application No. DE 101 12 025.7, filed on Mar. 6, 2001, the benefit of the earliest filing date of which is hereby claimed under 35 U.S.C. § 119 (a).

BACKGROUND

The present invention relates generally to the field of AM (amplitude modulation) broadcast transmitters which are to be converted from analog emission to digital transmission as digitalization moves forward, and particularly to a method for reducing out-of-band emission in AM transmitters for digital transmission.

The hitherto usual transmitter types are non-linear AM transmitters which feature an RF (radio frequency) input and an audio input and which are to continue in use. The reasons for this are as follows:

AM transmitters internally operate in switched mode and therefore have efficiencies which are better by a factor of 3 than those of linear transmitters which are otherwise usually used for digital transmission, for example, in the case of DAB (Digital Audio Broadcasting) and DVB (Digital Video Broadcasting). This results in a saving of operating costs.

it is easier to convince broadcasters to migrate from analog to digital if no greater investments come up in the preliminary stages.

The use of a non-linear AM transmitter for digital modulation requires a special operating mode of the transmitter. In the case of analog AM, only the envelope of the HF oscillation (high frequency) is influenced according to the message signal. If, in place of an audio signal, a digital signal was fed into the modulator, "on-off-keying" (OOK) or something equivalent to "amplitude shift keying" (ASK) would result as the digital modulation. In the vector diagram, OOK or ASK are only on the positive real axis, respectively.

In digital modulations, however, it is usual and, because of the better signal-to-noise ratio, also necessary for the digital signal to pass through the entire complex plane. When looking at the respective sampling points of a digital signal in the vector diagram, the appertaining phase star is obtained. Since the set points thereof are spread over 4 quadrants and do not lie on a straight line as in the case of OOK or ASK, the minimum distances of the set points are larger (given identical energy expenditure for the transmitted digital signal).

The modulated digital signal is generated by two partial signals (I and Q), which are orthogonal to each other. The I signal ("in phase") is modulated onto a cosine oscillation having the frequency Ft (carrier frequency). The Q signal ("quadrature") is modulated onto a sine oscillation having the same frequency Ft. The sum of both modulated oscillations produces the complex modulated data signal (cosine 0–180 degrees, sine 90–+90 degrees). The modulated I/Q signal is shaped by filters in such a manner that it has exactly the prescribed curve shape with the desired bandwidth.

However, it is required for the modulated I/Q signal to be converted in such a manner that the two signals amplitude signal (A signal) and phase-modulated carrier signal (RF-P) result therefrom which are suitable for proper control of the AM transmitter (see FIG. 2). Then, at the output of the AM transmitter, the modulated I/Q signal is generated again with higher power.

The modulated I/Q signal corresponds to a Cartesian representation. The Cartesian representation is converted to a polar representation with amplitude and phase. In this manner, the amplitude signal (A signal) is obtained to control the AM transmitter at the audio input. A phase-modulated radio frequency (RF-P signal) is generated from the initially resulting phase signal (P signal). Advantageously, the RF-P signal can also be directly obtained without the intermediate step via the P signal. In this manner, the signals are generated that are required for controlling the AM transmitter:

amplitude signal (A signal) for controlling the audio input phase-modulated RF signal (RF-P signal) for controlling the RF input.

The A signal is fed into the modulator input (audio input) of the AM transmitter, and the RF-P signal is used for HF-type control of the transmitter. In the transmitter output stage, the two signals A & RF-P are multiplicatively combined, forming the high frequency digital output signal. The output signal is theoretically identical to the correspondingly amplified complex modulated I/Q signal prior to the coordinate conversion.

The above-described use of AM transmitters is described, for example, in European Patent EP 0 708 545 and in German Patent DE 197 17 169.

SUMMARY OF THE INVENTION

In practice, the digital output signal of a transmitter is not exactly identical to an amplified modulated I/Q signal. Rather, the output signal is different because of the non-linear distortions occurring during the modulation process and the unwanted emissions resulting therefrom.

The Cartesian polar transformation required for the digital operation of AM transmitters is very highly non-linear. As a result of this, both the A-signal and the RF-P signal have very large bandwidths and consequently become considerably broader than corresponds to the bandwidth of the I and Q signals. This results in the following problems:

1. The transmitter must have a considerably greater bandwidth (factor 5 or more) in its A branch than is required for analog AM.
2. The transmitter must also have a greater bandwidth (factor 5 or more) in the RF branch than is required for analog AM.
3. The signal propagation times of the two branches must be identical (down to fractions of a microsecond) to allow the A and RF-P signals to combine in sync in the transmitter output stage.
4. The spectral components of the A signal and the RF-P signal that go beyond the channel limits (i.e., bandwidth of the I/Q signal) have to compensate for each other in the transmitter output stage. Otherwise unwanted emissions will occur (out-of-band emissions—OOB & spurious emissions—SE).

Since a transmitter output stage is an analog object, the required compensation of the spectral components that go beyond the channel limits succeeds only imperfectly. Practice has shown that these unwanted spectral components can be suppressed with justifiable effort only by about 30 dB (factor 1000 in power) to about 36 dB (factor 4000). These are the distances between the magnitude of the useful spectrum and the noise spectrum of the unwanted emissions. These distances are called "shoulder distances". Required are shoulder distances of 40 dB (factor 10 000) to 55 dB (factor 320 000) in order to comply with the permitted spectrum mask as defined by the ITU (International Telecommunications Union, Geneva).

The ITU spectrum mask (ITU-R SM.328-9, Spectra and Bandwidth of Emissions: 3.6.1.3 Out of Band Spectrum) defines the maximum allowed level of unwanted emissions of an AM transmitter. Due to the international coordination of AM transmitters, the absolute maximum values of the unwanted emissions are determined by the ITU spectrum mask.

In the immediate vicinity of the useful spectrum, the mask provides a tolerance range which can make it possible to achieve compliance with the requirements of the ITU mask. According to this, the out-of-band emission for a given shoulder distance only has to decrease fast enough in order that the ITU mask is not exceeded. This is shown in FIG. 1 for several examples, the assumption being made here that the digitally generated sideband power is just as high as the nominal analog sideband power determined for the ITU mask (−12 dB below the carrier power).

From this representation, it can be seen that the smaller the shoulder distance attained in the transmitter, the higher must be the gradient (or fall) in the out-of-band emission. If, for technical reasons, a shoulder distance of, for example, only 35 dB can be attained in the transmitter output stage, the digital modulation signal must therefore be influenced in such a manner that at least an OOB gradient of 10 dB/7.2 kHz for a channel bandwidth of 10 kHz, in general terms, 10 dB/(0.72×bandwidth), is achieved.

Influencing the digital modulation signal in the transmitter and its effect on the OOB gradient for reducing the unwanted emissions are an object of the present invention.

The present invention provides a method for reducing out-of-band emission in an AM transmitter for digital transmission. The method includes: generating, from a digital modulation signal, an amplitude signal and a phase-modulated radio frequency signal configured to control the AM transmitter; and using a digital modulation process in which a hole is formed around a 0/0 point so that a zero crossing is avoided by a substantial margin in a vector diagram representation so as to limit a respective bandwidth of the amplitude signal and the phase-modulated radio frequency signal so that the out-of-band emission decreases as a function of a shoulder distance achievable by the AM transmitter at a rate where a spectrum mask is not exceeded.

In the vector diagram representation, if no special measures have been taken, the digital modulation signal can move from any permissible complex point desired to any other permissible point on curved paths which connect all permissible points without forming kinks. As a result of this, a very high number of zero crossings or nearly zero crossings occur in the vector diagram.

During the Cartesian polar transformation, therefore, sharp peaks with zero contact or almost zero contact occur in the A-signal as well as jumps by pi in the phase. Both characteristics result in that both the A-signal and the RF-P signal obtain a very large bandwidth. Due to the compensation required in the transmitter output stage, this is not desired and has to be avoided.

When avoiding the peaks in the A-signal and thus at the same time the phase jumps, then the change in direction in the A-signal is, in fact, maintained but is not so fast any more. Also maintained is a phase transition of pi (instead of a jump) which, however, is also not so fast any more as in the case of a jump. In this manner, the bandwidths of the A signal and the RF-P signal become markedly narrower and the gradient of the respective spectra becomes greater. Overall therefore, the compensation process in the transmitter output stage becomes less critical and the unwanted emissions decrease.

A more precise analysis of the processes shows that nothing much changes in the spectrum at frequencies that are close to the useful signal (channel limit), which means that the shoulder distance cannot be decisively increased by this measure. After all, the size of the shoulder distance is dependent on the achievable compensation. On the other hand, the gradient in the spectrum of the out-of-band emission increases so that the desired value of 10 dB/(0.72× bandwidth) can be attained if a shoulder distance of 35 dB is achieved through the compensation.

BRIEF DESCRIPTION OF THE DRAWINGS

FIG. 4-B shows a representation in the time domain of a modification of the BPSK test sequence shown in FIG. 4-A; and FIG. 4-C shows representation in the time domain of a modification of the modified BPSK test sequence shown in FIG. 4-B.

DETAILED DESCRIPTION

The avoidance of "zero contacts" of the A-signal and thus of jumps in the phase is achieved by, as it were, "boring a hole" in the vector diagram at the 0/0 point. This means that a modulation must be chosen which avoid the 0/0 point by a wide margin in the vector diagram.

In the case of the DRM system (Digital Radio Mondiale) for digital transmission in the AM bands, which has been recommended by the ITU for standardization and which uses an OFDM (Orthogonal Frequency Division Multiplex) multicarrier method, it is not so easily possible to make a "hole" in the vector diagram because of the noise-like character of the transmission signal. Therefore, the DRM system places very high linearity requirements on the transmitter, which consequently requires correspondingly large shoulder distances. This means that new, highly linear AM transmitters still have to be developed for the DRM system to be able to comply with the requirements regarding unwanted emissions according to the ITU spectrum mask. This is expensive and tedious and possibly jeopardizes the introduction of the DRM system altogether.

By using a modulation method with a "hole" around the 0/0 point, existing AM transmitters having shoulder distances smaller than 35 dB, which are usual today, can also be used for digital transmission in the AM bands, as is also called for by DRM in the "service requirements". The possibility of continued use of existing transmitters is the highest priority for broadcasters. Only a digital modulator for conditioning the A-signal and the RF-P signal (see FIG.

2) is additionally required. In this manner, a conversion from analog to digital is possible without greater costs in relation to the transmitting installation.

Figure 1:
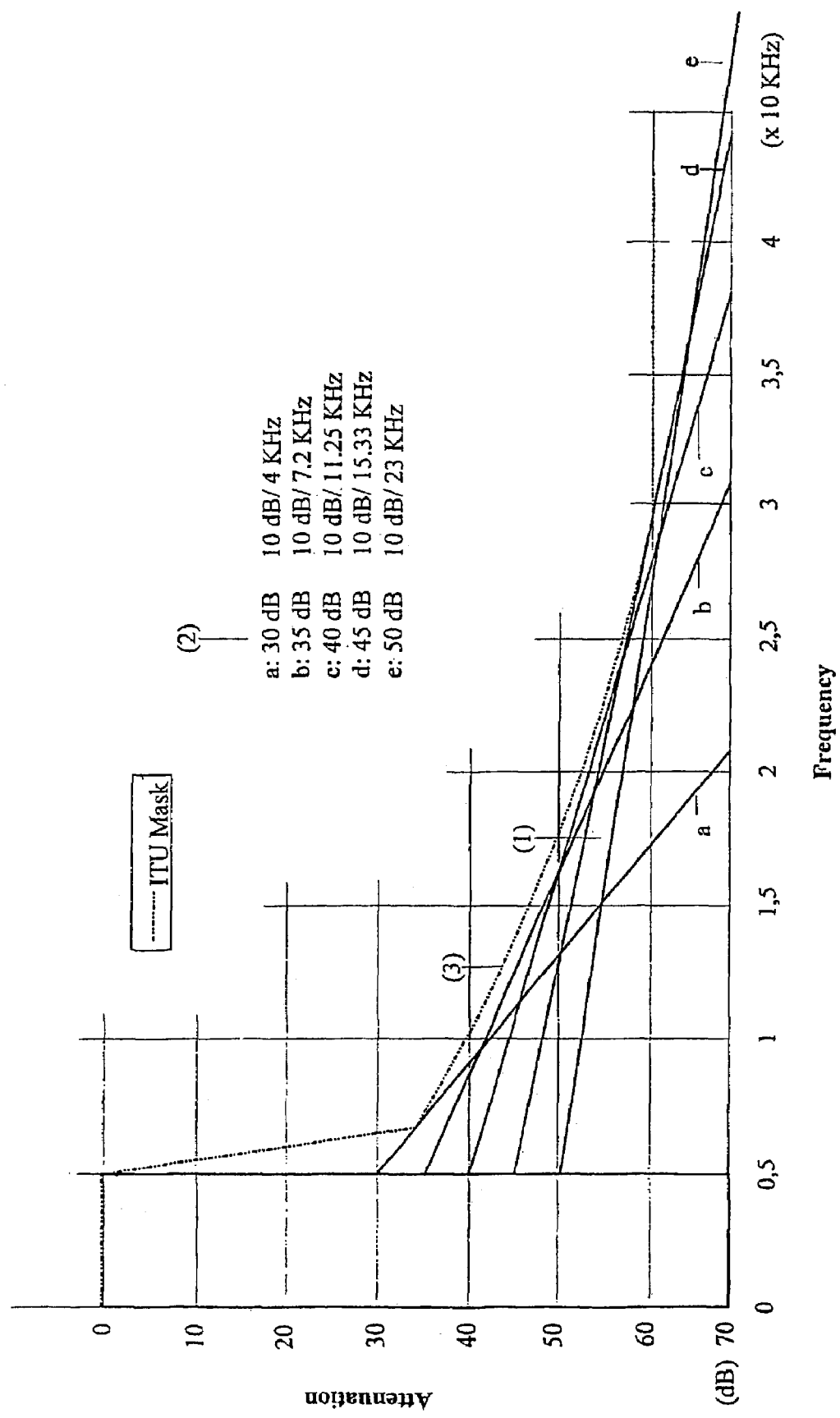
FIG. 1 shows a graph of Attenuation versus frequency depicting the ITU spectrum mask and the decrease in out-of-band emission for various shoulder distances.
Figure 2:
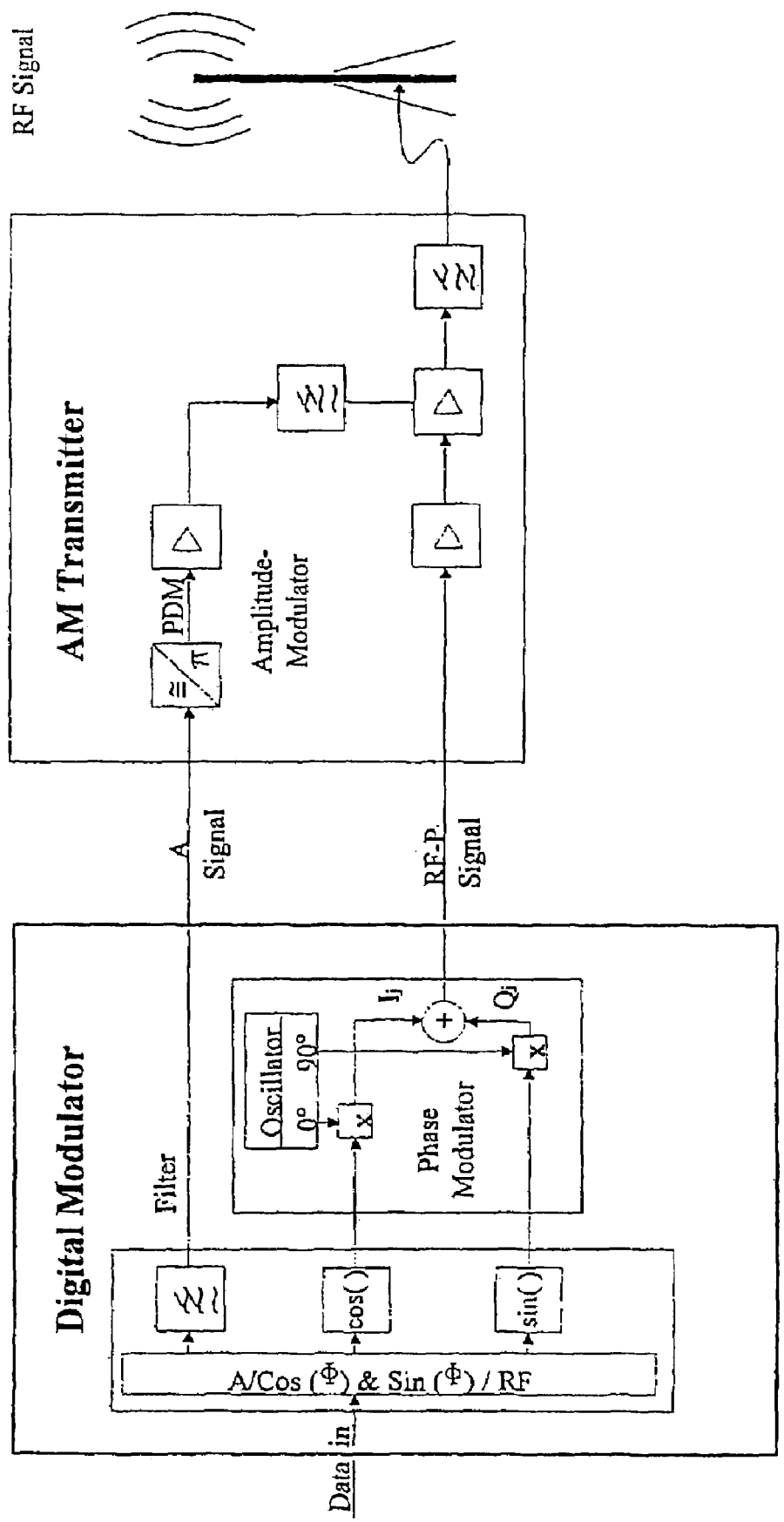
FIG. 2 shows a device for digital transmission using an AM transmitter.

FIG. 2 illustrates an AM transmitter in which the A signal is input to an amplitude modulator at a pulse duration modulation (PDM) modulator 10. The resulting PDM signal is amplified by a first single-input amplifier 20 and filtered through a first filter 30. The corresponding RF-P signal is amplified by a second single-input amplifier 40 and multiplied with the processed A signal at a two-input multiplier 50. The resulting signal is filtered through a second filter 60 to produce the output RF signal.

For digital transmission in the existing AM bands, according to the present invention modulation methods which feature a "hole" around the 0/0 point are used. Modulation methods of that kind are known as offset modulations or coded modulations.

Such modulations are used, for example, in transmitters which are not able to reduced the amplitude of the high frequency to zero value. Examples of that are found in the case of satellite transponders having traveling wave tubes or in the case of GSM mobile telephones having transmitter amplifiers in class C operation.

Particularly suitable is a modulation type which is derived from 16 APSK (amplitude phase shift keying with 16 set points) The reason for that is that, especially for difficult short-wave transmissions, a smaller number of set points (for example, 16) results in a higher net data throughput than the use of a higher-level modulation (for example, 64 set points), because low-level modulation is inherently more rugged and requires less error protection coding.

EXAMPLE 1

Modification of an OFDM Signal

OFDM signals have a fairly rectangular spectrum but feature a noise-like character in the time domain, namely both for the 1-component and for the Q-component of the time signal. This is a result of the occurrence of the interference of many subchannels which are independent of each other.

If, in the case of OFDM signal, a certain degradation is accepted, that is, a slight increase of the bit error rate for a given signal-to-noise ratio, then it is possible to "bore a hole" in the vector diagram.

To this end, it is required to modify the I(t) and Q(t) components of the OFDM baseband signals. Only after this can the I/Q A/RF-P conversion and the transposition to the transmitter frequency be carried out.

The I(t) and Q(t) baseband signals are AC voltages and therefore each of them has zero crossings. The critical case, in which the 0/0 point is approximated or touched in the vector diagram, occurs when I(t) and Q(t) both have a zero crossing at the same time or with only a little difference in time. This can be seen when regarding I(t) as x and Q(t) as y in an x/y coordinate system (Cartesian). Thus, if also x=0, then y=0 is not allowed at the same time; otherwise the coordinate origin 0/0 is met which, however, must absolutely be avoided.

Figure 3:
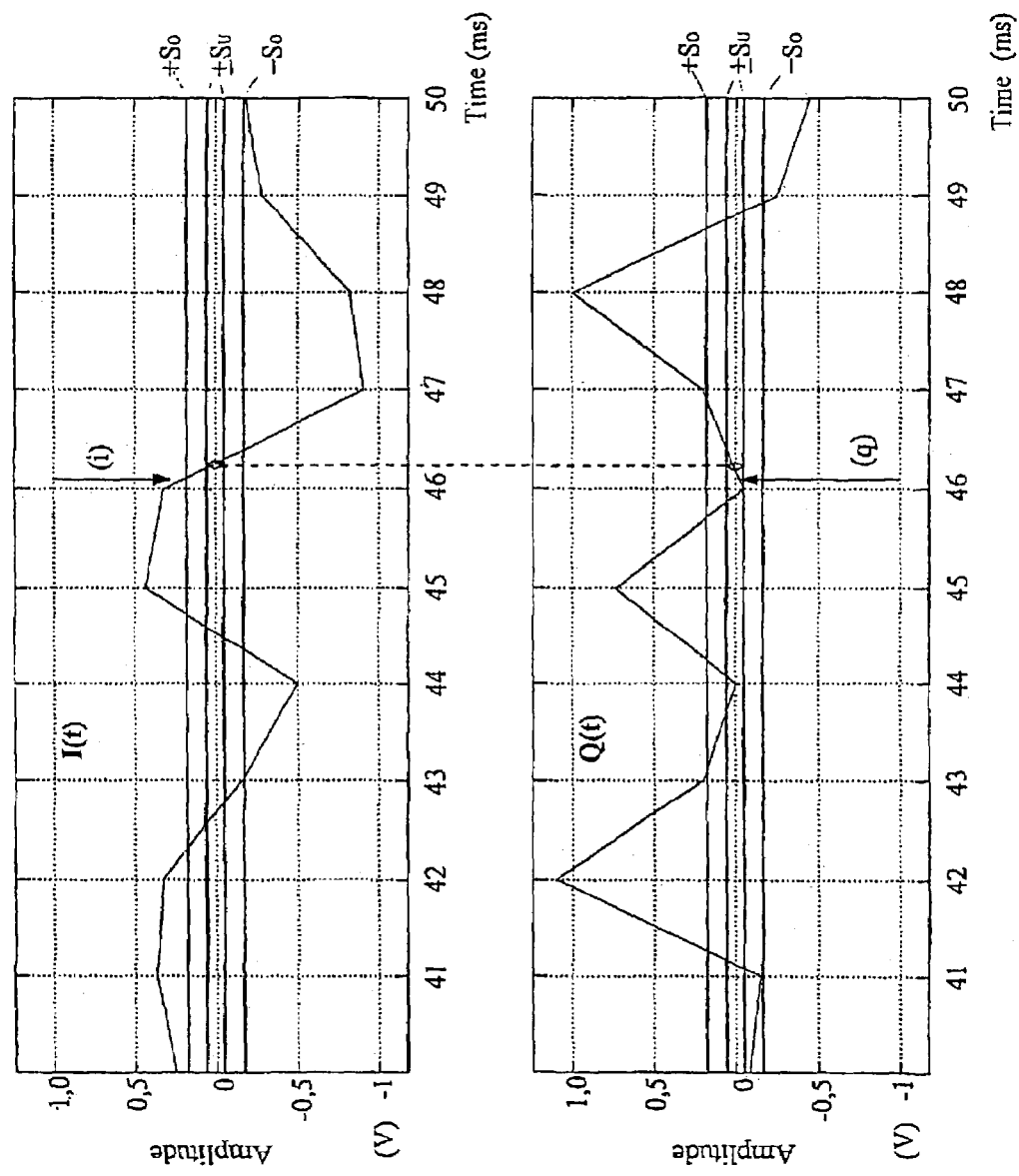
FIG. 3 shows graphs of Amplitude versus time for I(t) and Q(t) with threshold values.

The problem can be solved by defining threshold values $+S_0$, $+S_u$, $S_o$, $S_u$, where $S_o > S_u$, and continuously comparing the magnitudes of I(t) and Q(t) with these threshold values (see FIG. 3). The arrows mark a place where a correction is required in order for the I(t) signal to be shifted at its zero crossing. In practice, the I(t) and Q(t) signals are rounded and do not have kinks.

When looking at the case where Q(t), coming from positive values, falls below the low threshold $+S_u$ as the first of the two signals (coming from negative values, it would be threshold $S_u$), I(t) will have a zero crossing immediately afterwards.

For I(t), it is checked whether the signal has fallen below threshold $+S_o$ when coming from positive values or below threshold $S_o$ when coming from negative values. If this is the case, then it is to be expected that the signal falls below the respective $S_u$ threshold shortly after and that then the zero crossing occurs. This would mean that the zero crossings of signals I(t) and Q(t) would follow each other too closely, which is to be avoided according to the preceding consideration.

Zero crossings of the I(t) and Q(t) signals cannot be absolutely avoided. What is to be achieved here is to move the zero crossing so far apart in time that the two signals do not have low amplitude values at the same time. For the example described, this means that the I(t) signal must be influenced in such a manner that the zero crossing occurs far enough in time from the zero crossing of the Q(t) signal.

In the example, a rounded pulse is added to the I(t) signal for this purpose, the preceding sign of the rounded pulse being selected depending on the preceding sign of the $S_u$ threshold. In this manner, the I(t) signal is "bent" for a short time in such a manner that is makes its zero crossing at a sufficient distance from the Q(t) signal.

Advantageously, the additional pulse has a $\cos^2$ shape or a Gaussian bell-shaped curve which has to be selected such that the bandwidth of the emitted signal is not increased. The amplitude of the additional pulse is determined from the gradient of the I(t) or Q(t) signals, it being required to select the amplitude in proportion to the gradient.

The modified I(t) and Q(t) signals are I/Q A/RF-P converted and fed to the AM trasmitter as described above. Due to the modification, the A(t) and RF-P(t) signals have a smaller bandwidth in the transmitter than in the case of modulation with the OFDM baseband.

In the transmitter output stage, where the A(t) and RF-P(t) signals combine to form the output signal of lower bandwidth, namely of the channel bandwidth, less compensation is required because of the modification, as a result of which a lower out-of-band emission is achieved.

The reduction in out-of-band emission becomes practically hardly noticeable in the size of the shoulder distance; however, the gradient with which the OOB decreases towards both sides increases. In this context, the larger the "hole" is selected in the vector diagram, the greater becomes the gradient.

However, the "hole" in the vector diagram cannot be made as large as desired because the OFDM signal is corrupted by the additional pulses. This is tantamount to intentionally adding noise. Therefore, it is necessary to chose a convenient compromise between the OOB and the bit error rate. The fact that the pilot symbols transmitted in the OFDM signal that are referred to by the receiver are also affected by the noise has an advantageous effect because the noise has less grave consequences because of this.

EXAMPLE 2

Modification of a BPSK Test Sequence

To measure the radio channel and also to synchronize the receiver, it is possible to use a BPSK (Binary Phase Shift Keying—pseudo random or CAZAC) test sequence. In this context, the characteristics of the test sequence are to be determined such that no unacceptably high unwanted emissions are generated.

A non-modified BPSK test sequence has frequent changes in sign. During the Cartesian polar transformation, therefore, sharp peaks with zero contact or almost zero contact occur in the A-signal as well as jumps by pi in the phase. Both characteristics result in that both the A-signal and the RF-P signal obtain a very large bandwidth. Due to the compensation process required in the transmitter output stage, this is not desired and has to be avoided.

Therefore, the BPSK test signal is modified in such a manner that a "hole" is formed in the vector diagram. Thus, the modified BPSK test signal belongs to a class of modulations which feature a "hole" around the 0/0 point in the vector diagram In the time domain, the non-modified BPSK test sequence looks as partially shown in FIG. 4-A. The pulses have size 1 and are regularly spaced in time (clocked) relative to each other. The known algorithms for evaluating the test sequence are intended to be usable for the modified test sequence as well.

Figure 4:
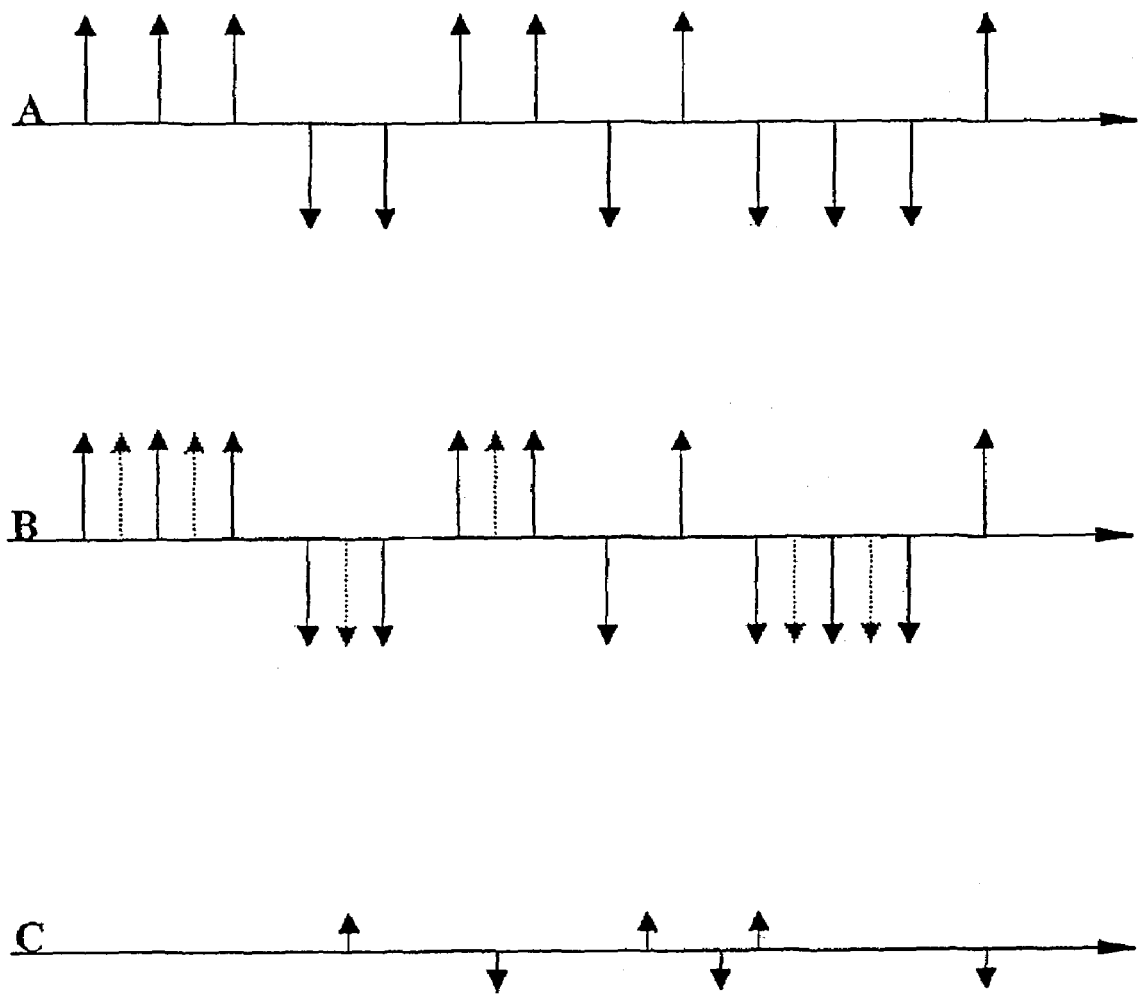
FIG. 4-A shows a representation in the time domain of a non-modified BPSK test sequence.

The modification consists in that, in a first step, the clock rate is doubled and in that a further pulse is placed exactly between two pulses of identical sign, respectively, as shown in broken lines in FIG. 4-B.

In a second step, everywhere where a change in sign of the pulses occurs in the non-modified test sequence (and only there), a pulse is inserted exactly in between (see FIG. 4-C). The pulses are smaller in size than 1 (for example, 0.2) and defined in direction such that a positive pulse is generated in the non-modified test sequence in response to a transition from + to − and a negative pulse is generated when the sign changes from − to + (definition I).

The definition is arbitrary so that the signs of the pulses in the modified test sequence can equally be chosen the other way around, which will be referred to as definition II.

Due to the modified signal (FIG. 4-C), a rotation is produced in the modulated signal when viewed in the complex plane. The rotation causes an asymmetry in the spectrum. In order to avoid the asymmetry, the pulses are determined according to definition II each time the sequence is repeated. This results in a continues alternation of definitions for the pulse train.

Prior to modulation, the signals of the modified test sequence are passed through a rounding filter (for example, root raised cosine with roll-off=0.2).

The modulator for the modified and filtered test sequence has I/Q shape, the signal according to FIG. 4-B being modulated as I signal and the signal according to FIG. 4-C being modulated as Q signal.

Thus, it is guaranteed that the vector diagram of the modulated test signal gets a "hole" its origin.

At the receive side, no complex correlation is required. Rather, it is sufficient to separately correlate the receive-side I & Q signals with the signal that is generated in the receiver according to FIG. 4-B. Subsequent to this, the received I and Q components can be separated.

What is claimed is:

1. A method for reducing out-of-band emission in an amplitude modulation (AM) transmitter for digital transmission, the method comprising:
generating, from a digital modulation signal, an amplitude signal and a phase-modulated radio frequency signal configured to control the AM transmitter; and
using a digital modulation process in which a hole is formed around a 0/0 point so that a zero crossing is avoided by a substantial margin in a vector diagram representation so as to limit a respective bandwidth of the amplitude signal and the phase-modulated radio frequency signal so that the out-of-band emission decreases as a function of a shoulder distance achievable by the AM transmitter at a rate where a spectrum mask is not exceeded.

2. The method as recited in claim 1 wherein the digital modulation process includes an offset modulation process.

3. The method as recited in claim 1 wherein the digital modulation process includes a coded modulation process.

4. The method as recited in claim 1 wherein the spectrum mask is an ITU spectrum mask.

5. The method as recited in claim 1 wherein the digital modulation process includes an offset modulation process, the offset modulation process being a variant of amplitude phase shift keying with 16 set points in the vector diagram.

6. The method as recited in claim 5 wherein the variant of amplitude phase shift keying with 16 set points in the vector diagram includes a substantially small number of set points so as to provide a high net data throughput and is a low-level modulation so as to be rugged and require a low error protection coding.

7. The method as recited in claim 1 wherein:
the digital modulation process is useable for transmission of orthogonal frequency division multiplex signals; and
the using a digital modulation process in which a hole is formed around a 0/0 point is performed by:
shifting I(t) and Q(t) components of orthogonal frequency division multiplex baseband signals at respective zero crossings of the I(t) and QQ) components, the shifting of the zero crossings being made dependent on a decrease of the I(t) and Q(t) components below respective predetermined threshold values; and
correcting a first component by adding an additional pulse to the first component when the first component has fallen below an upper threshold and the second component has fallen below a lower threshold, a size of the hole being determined by an amplitude of the additional pulse.

8. The method as recited in claim 7 wherein a compromise is made between the size of the hole and a bit error rate caused by the additional pulse.

9. The method as recited in claim 1 wherein:
the digital transmission includes a measuring of a radio channel using a modified test sequence of binary phase shift keying; and
the using a digital modulation process in which a hole is formed around a 010 point is performed by:
doubling a clock rate and inserting a pulse between two pulses having a change in sign in a non-modified test sequence; and
modifying the test sequence so as to provide a modulation signal which features the hole around the 010 point in the vector diagram representation, a size of the hole being adjustable by using an amplitude of the inserted pulse.

10. The method as recited in claim 9 wherein the modified test sequence is capable of being evaluated using known algorithms useable for a non-modified test sequence.

* * * * *